(12) United States Patent
Dalal et al.

(10) Patent No.: US 6,708,222 B1
(45) Date of Patent: Mar. 16, 2004

(54) METHOD AND SYSTEM FOR LOCATING ENCLOSING OWNERS OF EMBEDDED OBJECTS

(75) Inventors: Ketan Dalal, Seattle, WA (US); Raja Krishnaswamy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 08/847,124

(22) Filed: May 1, 1997

(51) Int. Cl.[7] ................................................ G06F 9/44
(52) U.S. Cl. ...................... 709/315; 707/103; 717/165
(58) Field of Search ............................... 395/683, 680; 707/103; 709/303, 315, 316; 717/162–165

(56) References Cited

U.S. PATENT DOCUMENTS

| | | | | |
|---|---|---|---|---|
| 5,634,129 A | * | 5/1997 | Dickinson | 709/315 |
| 5,805,885 A | * | 9/1998 | Leach et al. | 709/316 |
| 5,895,472 A | * | 4/1999 | Brodsky et al. | 707/203 |
| 5,913,063 A | * | 6/1999 | McGurrin et al. | 717/109 |

OTHER PUBLICATIONS

Bjarne Stroustrup, Margaret A. Ellis. "The Annotated C++ Reference Manual", pp. 195–231, 1990.*
Dilascia, Paul. "OLE made almost easy: creating containers and servers uding MFC 2.5 . . . ", pp. 1–22, Apr. 1994.*
(Aho) Aho, Alfred et al. "Compilers Principles, Techniques, and Tools", Mar. 1988.*
Adams, Robert M. "Letters to the Editor, Subobject Members". p. 4, 1996.*

* cited by examiner

*Primary Examiner*—John Follansbee
*Assistant Examiner*—Lewis A. Bullock, Jr.
(74) *Attorney, Agent, or Firm*—Woodcock Washburn LLP (57) ABSTRACT

A computer-based method and system for generating a reference to an enclosing object from a reference to an embedded object that is embedded within the enclosing object. The enclosing object has an enclosing class, and the embedded object has an embedded class. Each class inherits a base class that has a reference counting data member. The system redefines the base class such that the reference counting data member is divided into an offset portion and a reference counting portion. The system then instantiates the enclosing object. The enclosing object has an enclosing object address, and the embedded object has an embedded object address. The system stores in the offset portion of the reference counting data member of the base class of the embedded object a difference between the enclosing object address and the embedded object address. When the system receives a reference to the embedded object, the system retrieves from the offset portion of the reference counting data member of the embedded object referenced by the received reference the difference between the enclosing object address and the embedded object address. The system then combines the retrieved difference with the embedded object address of the received reference to generate the enclosing object address.

22 Claims, 6 Drawing Sheets

METHOD AND SYSTEM FOR LOCATING ENCLOSING OWNERS OF EMBEDDED OBJECTS

TECHNICAL FIELD

This invention relates generally to a computer method and system for managing objects and, in particular, a method and system for locating enclosing objects.

BACKGROUND OF THE INVENTION

The use of object-oriented programming techniques can facilitate the development of complex computer programs. Programming languages that support object-oriented techniques are being used to develop these programs. One such programming language is C++. Two common characteristics of object-oriented programming language in general and of the C++ programming language are support for data encapsulation and data-type inheritance. Data encapsulation refers to the binding of functions and data-type inheritance refers to the ability to declare a data type in terms of other data types.

In the C++ programming language, object-oriented techniques are supported through the use of classes. A class is a user-defined type. A class definition describes data members and function members of the class. For example, the following is a definition of a class named Bicycle.

```
class Bicycle
{
    int     Height;
    int     SprocketF;
    int     SprocketB;
    Tire    TireF;
    Tire    TireB;
    .
    .
    .
};
```

The class Bicycle as shown contains data members that describe the characteristics of a bicycle, such as height and number of sprockets. The data members named Height, SprocketF, and SprocketB are declared to be integers. The data members named TireF and TireB are declared to be objects of class Tire. The following is a definition of a class named Tire.

```
class Tire
{
    int     Radius;
    int     Width;
    int     RPM;
    .
    .
    .
};
```

The class Tire includes data members that describe the characteristics of a tire, such as the radius, the width, and the speed in revolutions per minute of the tire.

In the syntax of the C++ programing language, the following statement declares an object named Bike to be of type Bicycle.

Figure 1A:
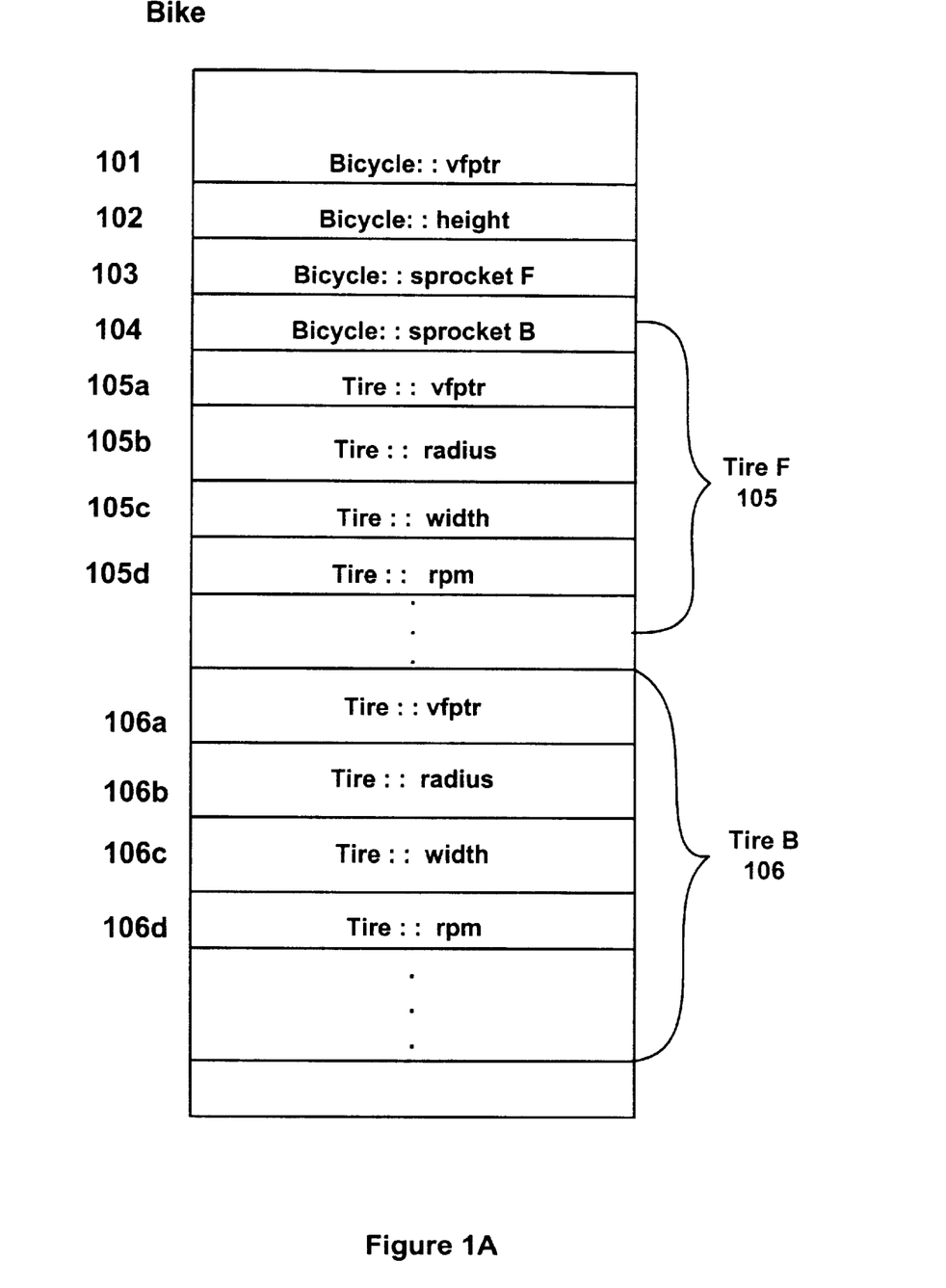
FIG. 1A illustrates the layout of memory for an object of type Bicycle.

Bicycle Bike;

This declaration causes the allocation of memory for an object named Bike, such an allocation is also called an instance of the class Bicycle. FIG. 1A illustrates the layout of memory for an object of type Bicycle. The Bike object contains a virtual function pointer 101, the Height data member 102, the SprocketF data member 103, the SprocketB data member 104, the TireF data member 105, and the TireB data member 106. A typical C++ compiler automatically allocates virtual function pointers for a class that declares a function member to be virtual. The memory layout includes instances of the type Tire for the TireF and TireB data members. The TireF and TireB objects include the Radius data members 105b, 106b, the Width data members 105c, 106c, and the RPM data members 105d, 106d. The TireF and TireB objects are considered to be embedded within the Bike object, since the TireF and TireB objects are data members of the class Bicycle. Thus, the TireF and TireB objects are considered to be embedded objects, and the Bike object is considered to be an enclosing object.

Certain object-oriented database systems provide application programs with access to the data of the database through C++-like objects. For example, if the database contains information describing various bicycles, then when an application program needs to access information relating to a certain bicycle, the database system would instantiate an object of a class Bicycle. The database system would then initialize the data members of the Bicycle object based on the data in the database for that bicycle. The database system would then provide the application program with a reference (e.g., the object address which is typically the first memory location allocated to the object) to the Bicycle object. The application program could then access the data members of the Bicycle object using the reference. In the following, the term "database objects" refers to the data that is persistently stored by a database system and the term "object" refers to an in-memory instance of a class that may contain the data of a database object.

Databases are typically transaction-oriented. A transaction is a sequence of modifications to a database that needs to be performed as a unit. That is, if one of the modifications in the sequence is made, then each modification in the sequence must also be made. To effect transaction processing, a database system would typically allow an application program to instantiate and modify objects corresponding to the database objects to be modified as part of the transaction. Once all the objects have been modified, then the application program would request the database system to "commit" those modifications. In response, the database system would cause the modifications to be stored persistently, for example, on a disk. When a transaction is to be committed, the database system needs to locate all instantiated objects so that the corresponding database objects can be updated. Database systems can use a couple of different approaches to locate the instantiated objects. First, the database system could maintain a table that contains a reference to each object that was instantiated as part of the transaction. However, such an approach may be unacceptable because of the amount of memory needed to store the table and because of the amount of processing needed to maintain the table. Second, the database system could simply maintain a small table that contains references to "root" objects of the transaction. The root objects are those objects from which each other object that was instantiated as part of the transaction are accessible. In such a case, the database system would start with a root object, and persistently store the data for that root object. If the root object contains pointers to other objects, then the database system would persistently store the data for those referenced objects in the database. The database system would repeat this process in a transitive manner for each object that is referenced through each root object. Although this second approach overcomes the overhead of maintaining a large table, the approach does not properly handle references to embedded objects.

Figure 1B:
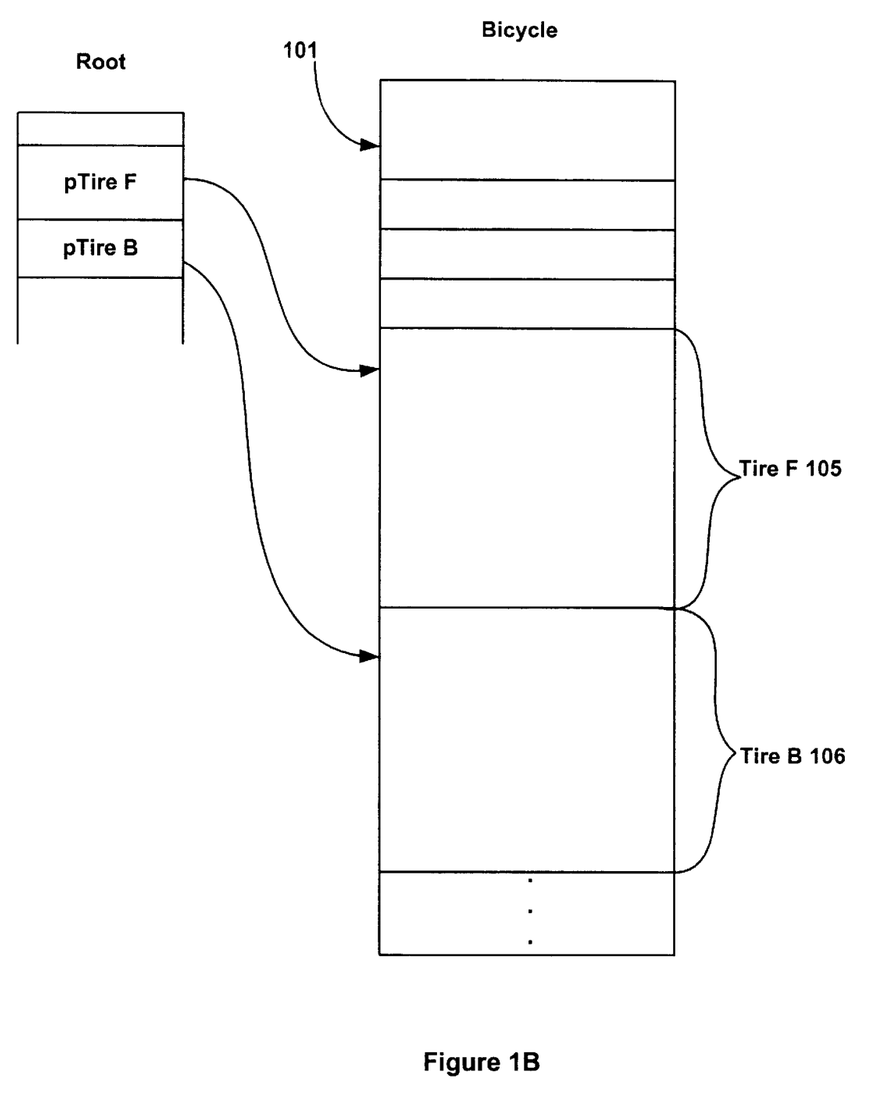
FIG. 1B illustrates references that point to embedded objects.

Certain objects may contain references that point to embedded objects rather than the enclosing-objects. FIG. 1B illustrates references that point to embedded objects. The root object points to the TireF and TireB objects that are embedded within the Bicycle object. The database system may have generated such references in the following way. The application program may have requested access to a certain root object that has references to the Tire objects for a certain make and model of bicycle (e.g., Schwinn/10-speed). The database system would instantiate a Bicycle object, but then store a reference to the embedded Tire objects in the root object, rather than storing a reference to the Bicycle object. When committing a transaction, the database system would need to determine which Bicycle object contains the embedded Tire objects so the tire information for the appropriate database object (e.g., Schwinn/10-speed) could be updated. When the database system follows a pointer to a Tire object, it needs to determine whether the object is embedded. If the object is embedded, the database system needs to retrieve or generate a reference to the enclosing object so that it can identify the database object from information that is in the enclosing object, but not within the embedded object.

Unfortunately, programming languages, such as the C++ programming language, do not provide a mechanism by which the location of an enclosing object can be determined from an embedded object. It would be desirable to have a mechanism by which a database system could determine the location of the enclosing object from a reference to an embedded object.

SUMMARY OF THE INVENTION

The present invention provides a computer-based method and system for identifying the most-enclosing object that encloses an object of a class. When an object of the class is instantiated within an enclosing object (i.e., embedded), the system sets a data member of the instantiated object to indicate an offset between the start of the instantiated object to the start of a nearest enclosing object. When an object of a class is not instantiated within an enclosing object, the system sets the data member of the instantiated object to indicate a zero offset. When the system receives a reference to an instantiated object, the system repeats the following until the reference points to a most-enclosing object. The system retrieves the offset from the object referenced by the current value of the reference. The system combines the retrieved offset with the current value of the reference to generate a new reference that references the nearest enclosing object of the previously referenced object. When the offset is zero, then the reference points to the most-enclosing object.

DETAILED DESCRIPTION OF THE INVENTION

The present invention provides a method and system for generating a reference to an enclosing object from a reference to an object embedded within the enclosing object. In one embodiment, each object that is instantiated in memory inherits a class that manages reference counting and that manages the persistent storage of objects. Thus, each object, whether embedded or not, includes a field for reference counting of that object. The reference counting field is typically 32 bits in size. To provide a mechanism for locating an enclosing object, one embodiment of the present invention redefines a portion of the reference counting field to be an offset field. For example, the high-order 8 bits are defined to be the offset field and the low-order 32 bits are used for reference counting. When an embedded object is instantiated, the offset field of that object is set to contain the difference between the address of the embedded object and the address of its enclosing object. Thus, the address of an enclosing object from the address of an embedded object can be generated by using the address of the embedded object to retrieve the value from the offset field and subtract that value from the address of the embedded object. When an object is embedded, its offset field is set to the offset to the enclosing object. However, if the object is not embedded then its offset field is set to zero. In this way, it can be detected whether an object is embedded. In an alternate embodiment, rather than subdividing the reference counting field, a new field may be added to each object. However, the addition of such a new field would increase the size of each object. An advantage of redefining the reference counting field is that the current size of objects need not be increased. However, the maximum reference count is reduced from $2^{32}$ to $2^{24}$ and only offsets of less than or equal to 256 ($2^8$) can be supported.

The following classes are sample classes that may be defined by a database system. The PersistentObject class defines a data member and function members for reference counting and defines a data member that contains a unique identifier for each object. Alternatively, each class could inherit the reference counting members from a class developed specifically to support reference counting (e.g., IUnknown class of Microsoft Corporation's Component Object Model). Although not shown, the PersistentObject class contains function members for persistently storing the object. Each class defined by the database system inherits the PersistentObject class. The Monitor class is an example of a class that contains references to embedded objects. The Bicycle class defines embedded objects of the Tire class.

```
class PersistentObject
{
    ID          *pID;
    ulong       refcount;
    virtual     Addref();
    virtual     Release();
    .
    .
    .
};
class Monitor:PersistentObject
```

-continued

```
{
    Tire* pTireF;
    Tire* pTireB;
    .
    .
    .
};
class Bicycle:PersistentObject
{
    .
    .
    .
    Tire        TireF;
    Tire        TireB;
    .
    .
    .
};
class Tire:PersistentObject
{
    .
    .
    .
};
```

Figure 2:
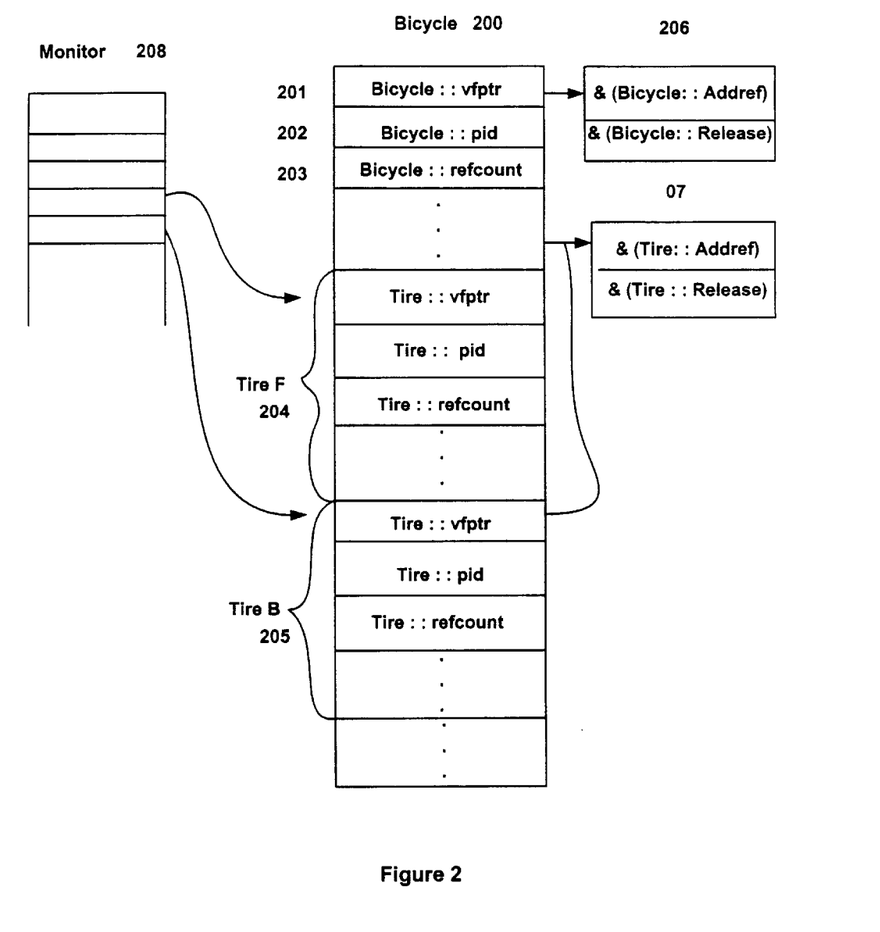
FIG. 2 is a block diagram illustrating a sample layout of classes of objects in memory.

FIG. 2 is a block diagram illustrating a sample layout of classes of objects in memory. The Bicycle object 200, which inherits the PersistentObject class, contain a reference 201 to the virtual function table 206 for the PersistentObject class. The virtual function table 206 contains references to the various function members defined for the Bicycle class. In addition, the Bicycle class contains the data member for reference counting 203. The embedded Tire objects 204 and 205 also contain a virtual function pointer and a reference counting data member. The Monitor object 208 contains references to the embedded Tire objects 204 and 205. When the Bicycle object is instantiated, the high-order bits of the reference counting data member (i.e., the offset field) of the embedded Tire objects are set to the difference between the address of the Bicycle object and the address of embedded Tire object. Since the Bicycle object is not an embedded object, the high-order bits of its reference counting data member 203 are set to zero.

Figure 3:
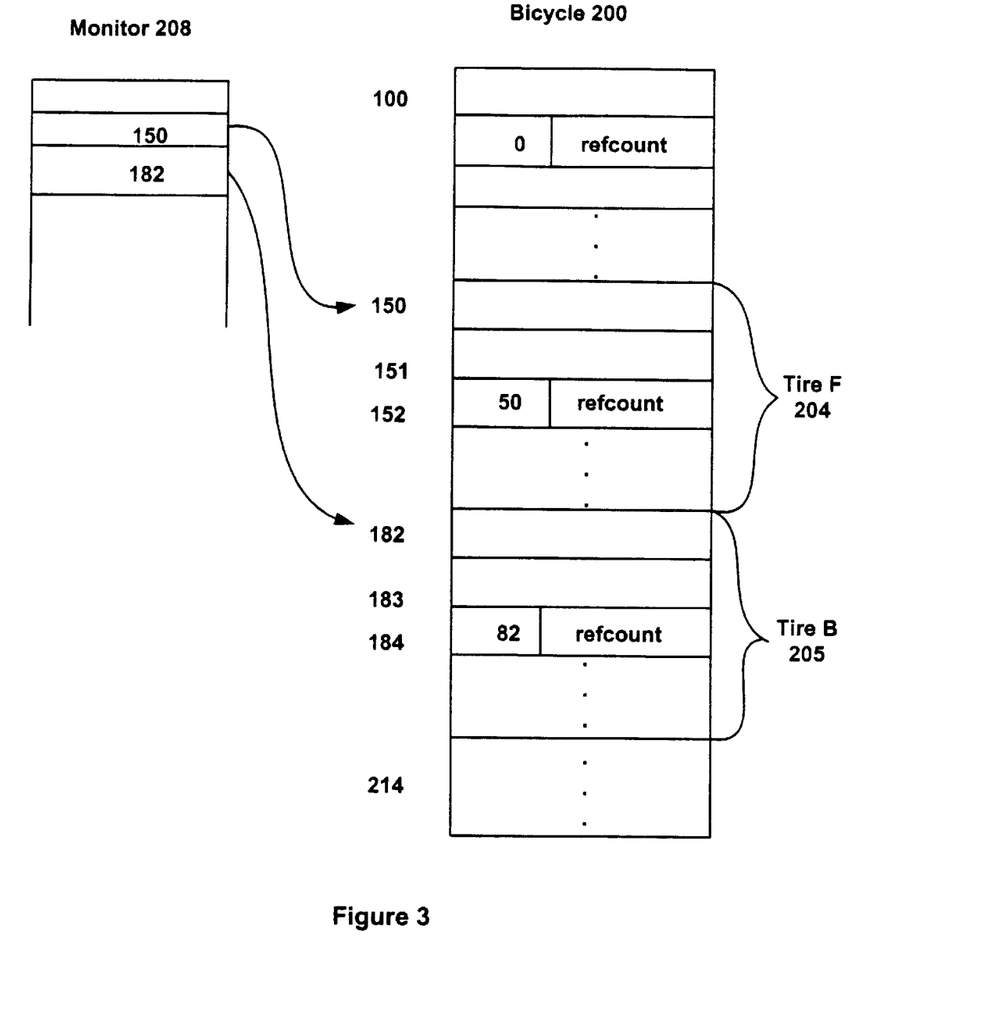
FIG. 3 is a block diagram illustrating the setting of the offset field of objects.

FIG. 3 is a block diagram illustrating the setting of the offset field of objects. In this example, the Bicycle object starts at an address of 100. The embedded TireF object starts at an address of 150 and the embedded TireB object starts at an address of 182. When an object is instantiated, if the object is embedded, the high-order byte of the reference counting data member of the object is set to contain the offset between the address of the embedded object and the address of the enclosing object. If the object is not embedded, then the high-order byte is set to zero. In this example, since the embedded TireF object starts at address 150 the offset field is set to 50. Thus, the starting address of the Bicycle object can be derived from a reference to the embedded TireF object by subtracting 50 from the value of the reference (i.e., the address of the embedded TireF object). Similarly, the high-order byte of the reference counting data member for the TireB object contains an 82. The high-order byte for the reference counting data member of the Bicycle object contains a zero, because the Bicycle object is not an embedded object.

Figure 4:
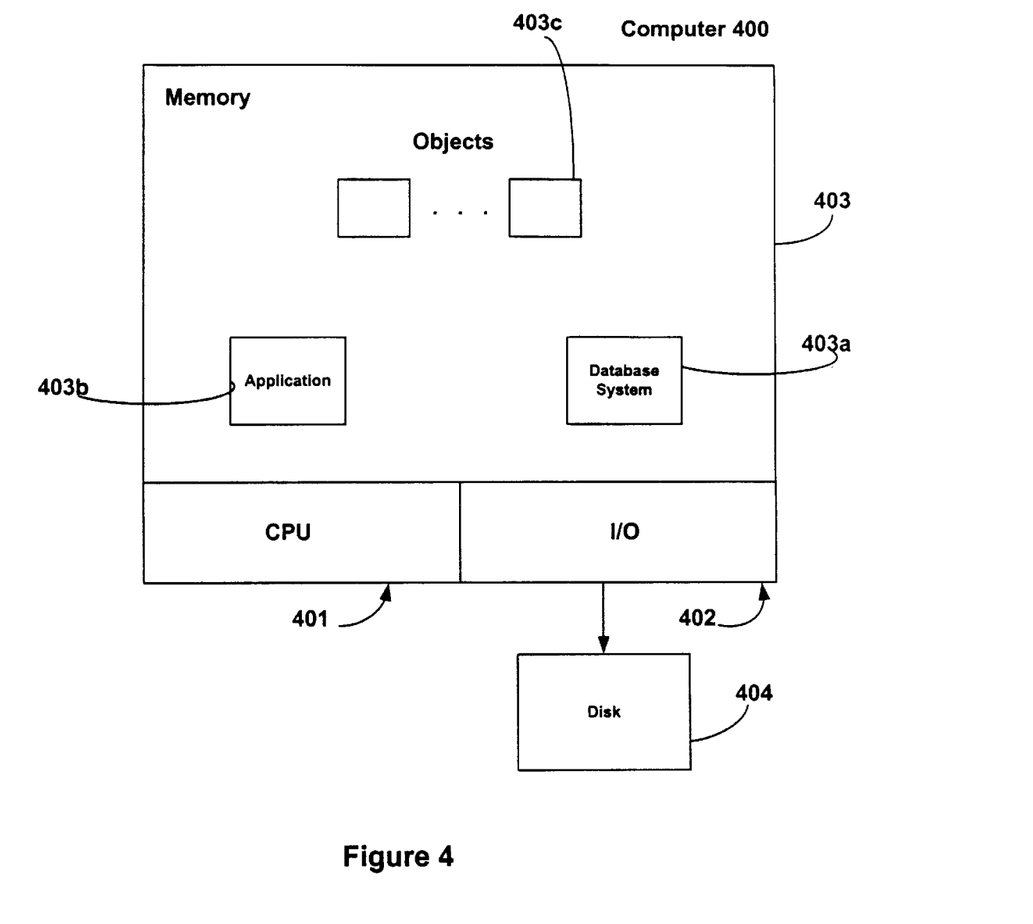
FIG. 4 is a block diagram illustrating a computer system for practicing the present invention.

FIG. 4 is a block diagram illustrating a computer system for practicing the present invention. The computer system 400 includes a central processing unit 401, input/output interface 402, memory 403, and peripheral devices, such as disk drive 404. The memory contains the database system 403*a* and application program 403*b*. The various objects 403*c*, which are instantiated by the database system, have an offset field for locating embedded objects. The offset fields can be initialized by constructors of enclosing objects, by the database system when it stores data from the database into the object, or by other means as described below. The database system and means for initializing the offset field may be stored on other computer-readable media, such as a disk.

The offset field of an embedded object is typically initialized when the object is instantiated. The constructor of the enclosing object knows the offsets of its embedded objects and can thus initialize the offset fields within the embedded objects. When an object is instantiated by a database system, the object may refer to other objects. However, the database system typically do not instantiate and load objects corresponding to those referenced objects until those references are actually accessed by the application program. To implement such a delayed instantiation (i.e., lazy binding), a database system may set the reference to a point to a special type of binding object. That binding object may have its referencing operator overloaded. When the special object is first referenced, the overloaded referencing operator would cause the actual object to be instantiated and loaded into memory. The overloaded operator could then set the offset field of any embedded objects.

Figure 5:
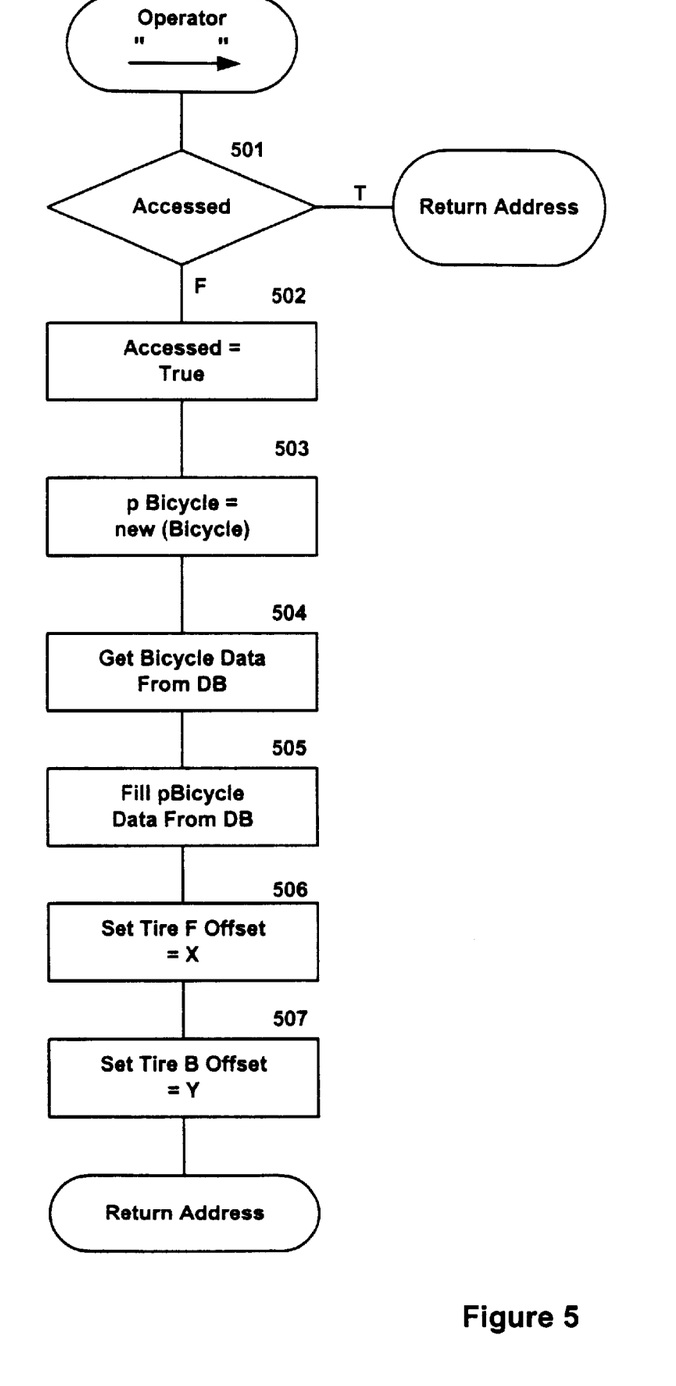
FIG. 5 is a flow diagram illustrating the overloading of a reference operator.

FIG. 5 is a flow diagram illustrating the overloading of a reference operator. The overloading of the reference operator allows certain functionality to be performed when the object is first referenced. That is, when a reference is first accessed, a database system would instantiate the object in memory, initialize the data members from the database, and set the offsets for any embedded objects. In step 501, if the object has already been accessed, then the method simply returns the address of the object, else the method continues at step 502. In step 502, the method sets a flag to indicate that this object has already been accessed. In step 503, the method instantiates a new Bicycle object. In step 504, the method retrieves the data for that Bicycle object from the database. In step 505, the method fills the Bicycle object with the data from the database. In step 506, the method sets the offset field of the embedded TireF Is object to point to the offset of the embedded object within the Bicycle object. In step 507, the method sets the offset of the embedded TireB object to contain the offset of the object within the bicycle object. The method then returns with the address of the bicycle object.

The present invention can also be used to locate enclosing objects when an embedded object itself contains an embedded object. In other words, the embedded objects are nested to an arbitrary level. In such a case, the offset field of each embedded object would contain the offset of its immediately enclosing object. To find the address of the most-enclosing object (i.e., the outer object) each time a reference to an enclosing object is generated the offset field of that enclosing object is checked. If the offset field is not zero, then that enclosing object is also an embedded object. Therefore, that non-zero offset is subtracted from the address of the enclosing object to give the address of the enclosing object at the next level. This process is repeated until an enclosing object has an offset of zero, which means that it is the most-enclosing object.

The techniques of the present invention can be used in environments other than relating to database systems. The present invention can in general be used with any environment in which one object is embedded in another object. In particular, the present invention can be used when representing objects in memory that correspond to objects that may reside on disk or some other medium. In addition, the locating of the enclosing object may be useful when reference counting, when marking an object as modified (i.e., dirty), or when deleting an object. An embedded object may have a method for reference counting, a method for marking the object as modified, or a method for deleting the object. If such a method is invoked, that method may locate the enclosing object and invoke a corresponding method on the enclosing object. In this way, information is effectively passed from the embedded object to its enclosing object that may have responsibility for keeping track of reference counts and dirty flags for the entire object and for deleting the entire object.

Although the present invention has been described in terms of a preferred embodiment, it is not intended that the invention be limited to these embodiments. Modifications within the spirit of the invention will be apparent to those skilled in the art. For example, although this embodiment is described using the C++ programming language, the present invention can be used in any environment in which one object is embedded in another object. The scope of the present invention is defined by the claims that follow.

What is claimed is:

1. A method in a computer system for generating a reference to an enclosing object from a reference to an embedded object that is embedded within the enclosing object, the enclosing object having an enclosing class, the embedded object having an embedded class, the enclosing class and the embedded class inheriting a base class, the base class having a data member, the method comprising:

instantiating the enclosing object, the enclosing object containing an instance of the embedded object, the enclosing object having an enclosing object address, the embedded object having an embedded object address;

storing in the data member of the base class of the embedded object an indication of a difference between the enclosing object address and the embedded object address;

receiving a reference to the embedded object, the reference indicating the embedded object address;

retrieving from the data member of the embedded object indicated by the received reference the difference between the enclosing object address and the embedded object address; and combining the retrieved difference with the embedded object address of the received reference to generate the enclosing object address.

2. The method of claim 1 wherein the storing in the data member of the base class stores only in a portion of the data member.

3. A method in a computer system for identifying the most-enclosing object that encloses an object of a class, the method comprising:

when an object of the class is instantiated within an enclosing object, setting a data member of the instantiated object to indicate an offset between the start of the instantiated object to the start of a nearest enclosing object;

when an object of a class is not instantiated within an enclosing object, setting the data member of the instantiated object to indicate a zero offset;

generating a reference to an instantiated object; and repeating the following until the generated reference is to a most-enclosing object, retrieving the offset from the object referenced by the generated reference; and combining the retrieved offset with the generated reference to generate a new reference that references the nearest enclosing object of the previously referenced object.

4. The method of claim 3 wherein the repeating continues until a retrieved offset contains a value of zero.

5. The method of claim 3 wherein the data member is defined in a base class that is inherited by each class of an object.

6. The method of claim 5 wherein the offset is stored in a portion of the data member.

7. The method of claim 3 wherein the setting of the data member is performed by a constructor of the enclosing object.

8. The method of claim 3 wherein the setting of the data member is performed by an application that instantiates the enclosing object.

9. A method in a computer system for generating a reference to an enclosing object from a reference to an embedded object that is embedded within the enclosing object, the enclosing object having an enclosing class, the embedded object having an embedded class, the enclosing class and the embedded class inheriting a base class, the base class having a reference counting data member, the method comprising:

redefining the base class such that the reference counting data member is divided into an offset portion and a reference counting portion;

instantiating the enclosing object, the enclosing object containing an instance of the embedded object, the enclosing object being referenced by an enclosing object address, the embedded object being referenced by an embedded object address;

storing in the offset portion of the reference counting data member of the base class of the embedded object a difference between the enclosing object address and the embedded object address;

receiving a reference to the embedded object;

retrieving from the offset portion of the reference counting data member of the embedded object referenced by the received reference the difference between the enclosing object address and the embedded object address; and combining the retrieved difference with the embedded object address of the received reference to generate the enclosing object address.

10. The method of claim 9 wherein the storing in the offset portion is performed by a constructor of the enclosing object.

11. The method of claim 9 wherein the storing in the offset portion is performed by an application that instantiates the enclosing object.

12. A method in a computer system for generating a reference to an enclosing object from a reference to an embedded object that is embedded within the enclosing object, the enclosing object having an enclosing class, the embedded object having an embedded class, the embedded class having an offset data member, the offset data member containing an difference between an object address of the enclosing object and an object address of the embedded object, the method comprising:

receiving a reference to the embedded object;

retrieving from the offset data member of the embedded object referenced by the received reference the difference between the enclosing object address and the embedded object address; and combining the retrieved difference with the embedded object address of the received reference to generate the enclosing object address.

13. The method of claim 12 wherein the offset data member is defined in a base class that is inherited by the embedded class.

14. The method of claim 13 wherein the offset data member is a portion of a reference counting data member.

15. A computer-readable medium containing instructions for causing a computer system to identify the most-enclosing object that encloses a object of a class, by:

when an object of the class is instantiated within an enclosing object, setting a data member of the instantiated object to indicate an offset between the start of the instantiated object to the start of the enclosing object;

when an object of a class is not instantiated within an enclosing object, setting the data member of the instantiated object to indicate a zero offset;

receiving a reference to an instantiated object; and repeating the following until a retrieved offset is zero,
  retrieving the offset from the object referenced by the reference; and
  combining the retrieved offset with the reference so that the reference refers to the nearest enclosing object of the previously referenced object.

16. The computer-readable medium of claim 15 wherein the data member is defined in a base class that is inherited by each class of an object.

17. The computer-readable medium of claim 16 wherein the offset is stored in a portion of the data member.

18. The computer-readable medium of claim 15 wherein the setting of the data member is performed by a constructor of the enclosing object.

19. The computer-readable medium of claim 15 wherein the setting of the data member is performed by an application that instantiates the enclosing object.

20. A computer-readable medium containing instructions for causing a computer system to generate a reference to an enclosing object from a reference to an embedded object that is embedded within the enclosing object, the enclosing object having an enclosing class, the embedded object having an embedded class, the embedded class having an offset data member, the offset data member containing a difference between an object address of the enclosing object and an object address of the embedded object, by:

receiving a reference to the embedded object;

retrieving from the offset data member of the embedded object referenced by the received-reference the difference between the enclosing object address and the embedded object address; and combining the retrieved difference with the embedded object address of the received reference to generate the enclosing object address.

21. The computer-readable medium of claim 20 wherein the offset data member is defined in a base class that is inherited by the embedded class.

22. The computer-readable medium of claim 21 wherein the offset data member is a portion of a reference counting data member.

* * * * *